United States Patent [19]

Terauchi et al.

[11] Patent Number: 4,557,662
[45] Date of Patent: Dec. 10, 1985

[54] INDUSTRIAL ROBOT

[75] Inventors: Tsuneo Terauchi; Yoshikazu Masuda, both of Aichi, Japan

[73] Assignee: Mitsubishi Denki Kabushiki Kaisha, Tokyo, Japan

[21] Appl. No.: 478,122

[22] Filed: Mar. 23, 1983

[30] Foreign Application Priority Data

Mar. 24, 1982 [JP] Japan ................................ 57-46544

[51] Int. Cl.⁴ .............................................. B25J 3/00
[52] U.S. Cl. .................................. 414/744 R; 901/14; 901/21; 901/23
[58] Field of Search ....................... 414/744 R, 744 A; 74/640; 901/14, 15, 21, 23, 24

[56] References Cited

U.S. PATENT DOCUMENTS 4,392,776  7/1983  Shum ............................. 414/744 R
4,431,366  2/1984  Inaba et al. ....................... 414/735

FOREIGN PATENT DOCUMENTS 112789  8/1980  Japan .
62778   5/1981  Japan .
114051  7/1982  Japan ................................... 414/640

Primary Examiner—Robert J. Spar
Assistant Examiner—Donald W. Underwood
Attorney, Agent, or Firm—Sughrue, Mion, Zinn, Macpeak & Seas

[57] ABSTRACT

An industrial robot is disclosed in which inertia is reduced and backlash substantially eliminated by mounting motors for the first and second movable arms on a stationary stand, and transmitting torque to the second arm by means of timing belts. A harmonic gear mechanism arranged at the juncture of the first and second arms reduces the speed of the output timing pulley. The belt arrangement requires no lubrication and is lighter and much quieter in operation than previous torque transmitting arrangements.

5 Claims, 4 Drawing Figures

INDUSTRIAL ROBOT

BACKGROUND OF THE INVENTION

This invention relates to industrial robots, and more particularly to improvements in a horizontal articulation type industrial robot in which a first arm is rotatably mounted on the shaft of a stationary stand and a second arm is rotatably mounted at the end of the first arm.

Conventional horizontal articulation type industrial robots are shown in FIGS. 1 and 2.

As shown in FIG. 1, a first arm 12 is rotatably mounted on a stationary stand 10, and a second arm 14 extends from the end of the first arm 12. A motor 16 for driving the first arm is provided above the stationary stand 10, and a motor 18 for driving the second arm is provided on the end of the first arm 12. The end of the second arm 14 is coupled to a suitable hand 20. In this industrial robot, the first arm 12, the second arm 14 and the second arm driving motor 18 protrude sidewardly, and this part of the robot is relatively large in weight. Therefore, the arms 12 and 14 and the stationary stand 10 are liable to bend, and the robot itself is not suitable for high speed operations.

The industrial robot shown in FIG. 2 is an improvement of the robot of FIG. 1. In FIG. 2, those components which have been described with reference to FIG. 1 are designated by the same reference numerals, and a description thereof is therefore omitted.

In this industrial robot, the first arm driving motor protrudes in a direction opposite the direction of protrusion of the first arm 12, and the second arm driving motor 18 is provided with a planet type speed reducing unit 22 and is secured to the upper surface of the first arm 12 above the stationary stand 10. The output of the speed reducing unit 22 is transmitted through a shaft 24 to a bevel gear 26 at the end of the shaft 24, to rotate the bevel gear. The rotation of the gear 26 is transmitted through a bevel gear 28 to a shaft 30 integral with the second arm 14, to turn the shaft 30 and accordingly the second arm 14.

The planet type speed reducing unit 22 may be one bearing the trademark "Harmonic Drive" of Harmonic Drive Systems Co. The unit can transmit power from the input side to the output side at a predetermined gear reduction ratio. However, since the power transmitting mechanism employs gears, not only it is necessary to employ a gear adjusting means, but also it is necessary to use sealing materials for lubrication. Furthermore, the mechanism suffers from problems in that the gears are noisy and are subject to wear. In addition, the robot is disadvantageous in that the second arm 14 is liable to play owing to the backlash encountered in the use of a gear, and accordingly the accuracy of positioning operations is lowered, with the result that the robot cannot be used for assembly operations of high accuracy.

In addition to the foregoing prior art, Japanese publication No. 55-112789 discloses an industrial robot, wherein rotary drive mechanisms for the first and second arms are provided on respective rotary shafts. That is, the drive motor for the second arm is disposed on the first arm, so that the moment of inertia of the first arm is large, which is disadvantageous in the movement of the first arm. Japanese publication No. 56-62778 discloses a drive motor (17) for the second arm (12). The drive motor is disposed at a position opposite the first arm (11) with respect to a main sleeve (4). Further, bevel gearing is used for power transmission to the second arm. However, speed reduction means is disposed between the gearing and the motor, and backlash of the gearing may affect working accuracy. Even though a desirable moving balance may be obtainable in the device according to this publication, the moment of inertia is large, so that high responsiveness is not obtainable.

SUMMARY OF THE INVENTION

In view of the foregoing, an object of the invention is to provide an industrial robot in which swinging movement can be achieved at high speed while positioning can be performed with high accuracy, and in which cables can be readily arranged, adjustment and lubrication are not required, and noise is scarcely made.

The foregoing object and other objects of the invention have been achieved by the provision of a horizontal articulation type industrial robot in which a first arm is rotatably provided on a stationary stand and a second arm is rotatably coupled to the end of the first arm, in which, according to the invention, a second arm driving motor is provided on the stationary stand at the rear of the first arm, and the rotation of the second arm driving motor is transmitted through timing belts and a planet type speed reducing unit to a shaft about which the second arm is rotated.

BRIEF DESCRIPTION OF THE DRAWINGS

More specifically, FIG. 3 is a side view, with parts cut away, of the robot, and FIG. 4 is an enlarged sectional view of the front end portion of a first arm of the robot of FIG. 3.

DETAILED DESCRIPTION OF THE PREFERRED EMBODIMENTS

Figure 1:
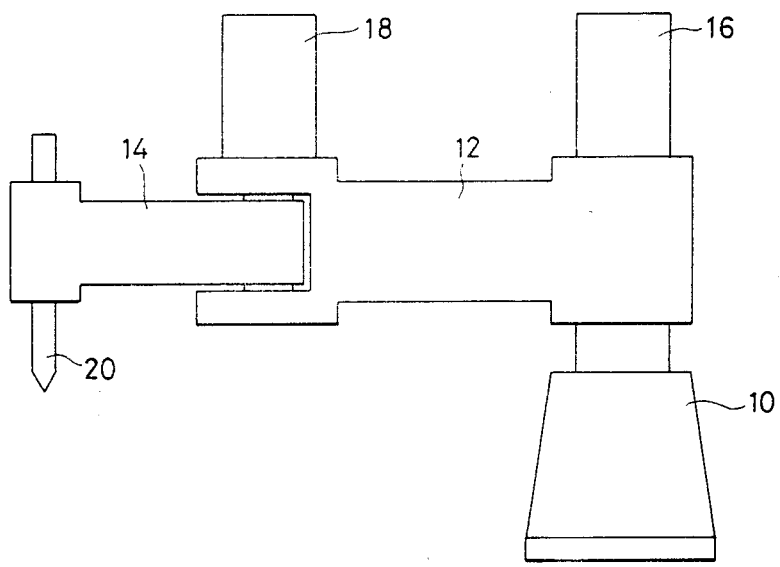
FIGS. 1 and 2 are side views showing two examples of conventional horizontal articulation type industrial robots.
Figure 2:
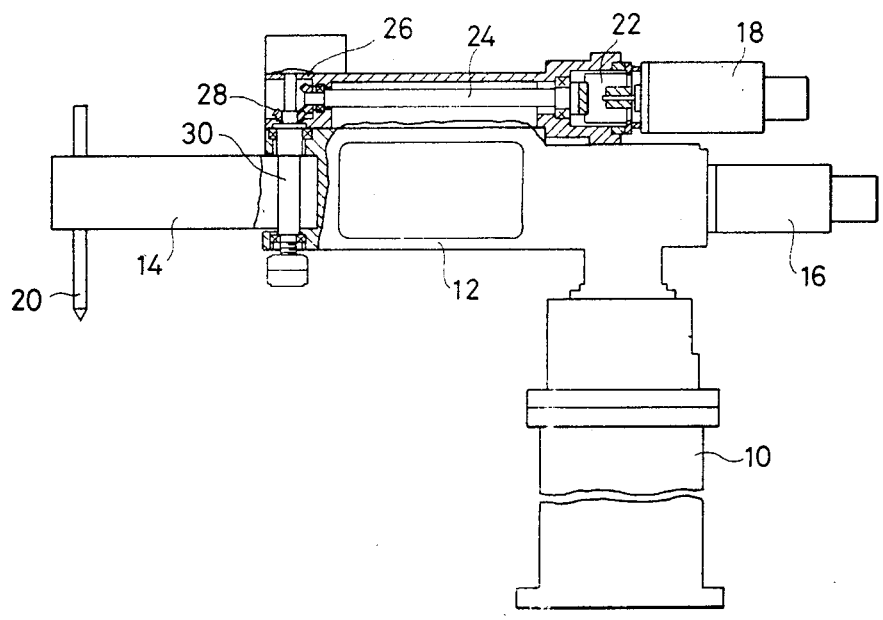
Figure 3:
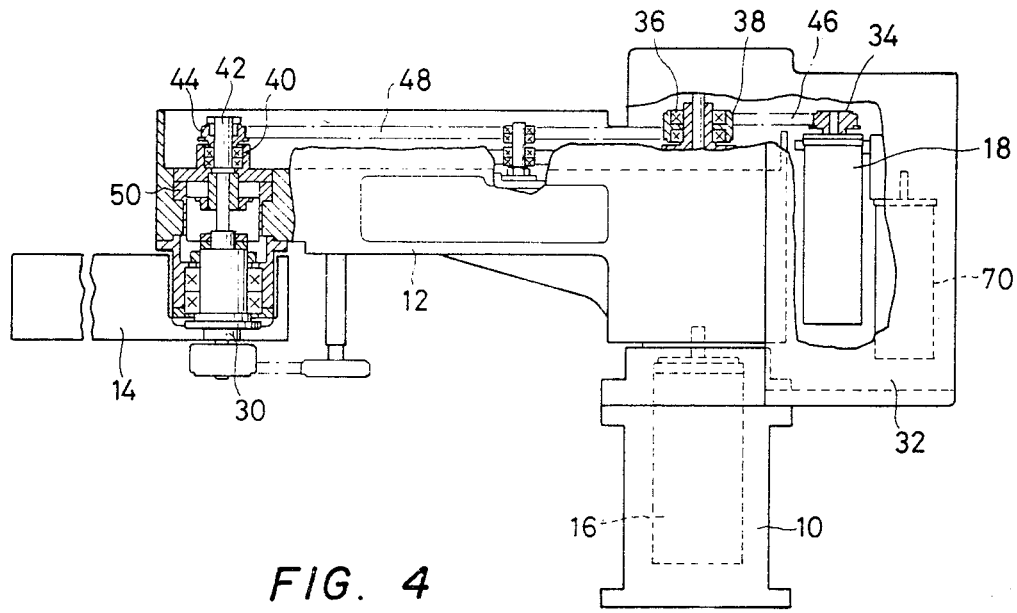
FIGS. 3 and 4 show one example of an industrial robot according to this invention.
Figure 4:
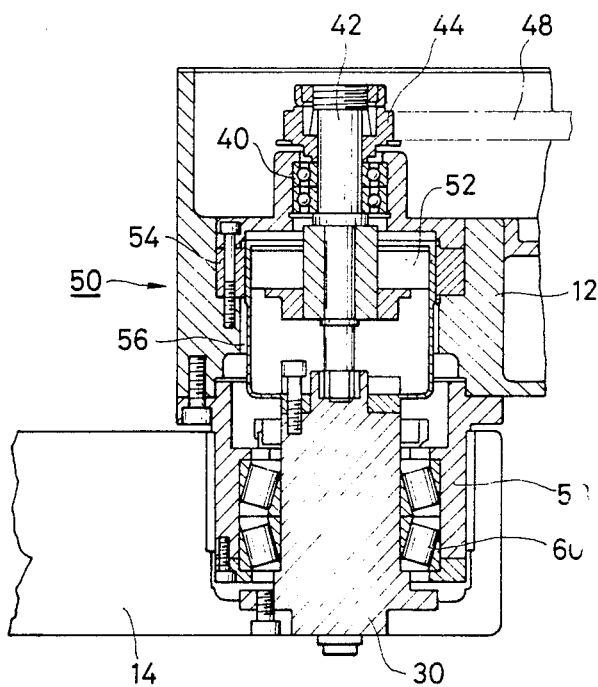

A preferred embodiment of this invention will now be described with reference to FIGS. 3 and 4. In FIGS. 3 and 4, those components which have been previously described with reference to FIGS. 1 and 2 are therefore similarly numbered and the preceding descriptions thereof are applicable.

A motor receiving box 32 is fixedly secured to the stationary stand 10. The second arm driving motor 18 is accommodated in the box 32. A timing pulley 34 is fixedly mounted on the output shaft of the motor 18. Two bearings 36 and a timing pulley 38 are arranged coaxially with the rotary shaft of the first arm 12. At the end of the first arm 12, a timing pulley 44 is fixedly mounted on a shaft 42 which is suported through bearings 40. A timing belt 46 in laid over the timing pulleys 34 and 38, and a timing belt 48 is laid over the timing pulleys 38 and 44. The lower portion of the shaft 42 is coupled through a planet type speed reducing unit 50 to the shaft 30 which is secured to the second arm 14 for rotation of the latter.

The unit 50 (trademark "Harmonic Drive") is made up of an elliptic cam 52 secured to the shaft 42, an internal gear 54 fixed to the first arm 12, and an elastic gear 56 secured to the shaft 30, the number of teeth of the gear 56 being generally smaller by two than the number of teeth of the gear 54. Thus, the rotation of the shaft 42, being reduced in speed by the ratio of two to the number of teeth of the elastic gear 56, is transmitted to the shaft 30. The unit 50 is the same as the conventional planet type speed reducing unit 22 shown in FIG. 2.

In FIGS. 3 and 4, reference numeral 58 designates a housing which extends downwardly from the end of the first arm 12; 60, bearings interposed between the housing 58 and the shaft 30; and 70, a motor for driving a band or the like which is connected to the end of the second arm 14.

In the industrial robot according to the invention, rotation of the second arm driving motor 18 is transmitted through timing belts 46 and 48 and the planet type speed reducing unit 50 to the shaft 30 for rotation of the second arm 14.

The robot shown in FIG. 3 is so designed that the first arm 12 is rotatable through about 270° to 280°, while in the conventional robot shown in FIG. 1 or 2 it is rotatable through 360°. However, no practical problem occurs in operation, because the second arm 14 is also rotatable through about 270° to 280°.

The second arm driving motor 18 is provided on the stationary stand 10 according to the invention. Therefore, the weight of the first arm 12 can be reduced, which makes it possible to reduce the inertia thereof, and not only can be first arm 12 swirl at high speed, but also the torque of the first arm driving motor 16 can be reduced.

The first arm driving motor 16 may be built into the stationary stand 10 or may be mounted on the rear end of the first arm 12 as shown in FIG. 2. However, it may be desirable to provide the first and second arm driving motors 16 and 18 on the stationary stand 10, because in this case the power cable and the like can be readily positioned.

Timing belts 46 and 48 are used to drive the second arm 14 as described above. Accordingly, when compared with a gear transmission system, the weight is small, the required space is also small, adjustment and lubrication are eliminated, and the generation of noise can be prevented.

The timing pulley 38 is provided coaxially with the rotary shaft of the first arm 12, and the torque of the second arm driving motor 18 is transmitted through the timing pulley 38 thus provided to the speed reducing unit 50. Therefore, no problems occur with the operations of the timing belts 46 and 48 even when the first arm 12 swings. This is due to the following reason: As the timing pulley 38 is mounted on the circumferential walls of the two ball bearings 36 which are mounted on the rotary shaft of the first arm 12, the pulley 38 is not affected by the rotation of the rotary shaft of the first arm 12.

The planet type speed reducing unit 50 is provided at the shaft 30 for rotation of the second arm 14 as described above. Therefore, the backlash of the timing pulleys 44 and 38 can be substantially neglected. Accordingly, a remarkable improvement in the positioning accuracy can be obtained.

That is, in the robot of the invention, unlike conventional robots in which the gears are arranged at the output side of the planet type speed reducing unit, the planet type speed reducing unit is instead provided at the output side, which is in this case the rear stage of the timing pulleys and timing belts, and accordingly, backlash is decreased with speed reduction, and is negligible.

As is apparent from the above description, in the industrial robot of the invention, work efficiency and positioning accuracy are improved while the inertia of the moving parts is lowered as a whole. Furthermore, the robot of the invention needs no lubricating structure or lubrication as is unavoidably required by conventional robots. Thus, the industrial robot of the invention is excellent as respects maintenance.

What is claimed is:

1. An industrial robot, comprising:
   a stationary stand which supports a shaft;
   a first arm rotatably mounted on said shaft;
   motor receiving means fixedly secured to said stationary stand at the rear of said first arm;
   speed reducing means mounted at the front end of said first arm;
   a second arm secured to a second shaft coupled to the output side of said speed reducing means;
   a second arm driving motor secured in said motor receiving means and having an output shaft on which a first timing pulley is fixedly mounted;
   a first arm driving motor built into said stationary stand;
   a first timing belt laid over said first timing pulley and a second timing pulley which is coaxially mounted on the end of said shaft supported by said stationary stand; and
   a second timing belt laid over said second timing pulley and a third timing pulley mounted on a third shaft coupled to the input side of said speed reducing means, said second timing belt being accommodated inside said first arm.

2. An industrial robot as claimed in claim 1, said second timing pulley being interposed between said motor and said speed reducing unit in a torque transmission path of said second arm driving motor.

3. An industrial robot as claimed in claim 1, wherein said second and third timing pulleys are arranged inside said first arm.

4. An industrial robot as claimed in claim 1, said motor receiving means comprises a receiving box.

5. An industrial robot as claimed in claim 1, wherein said speed reducing means comprises a harmonic speed reducer.

* * * * *